United States Patent Office 3,386,919
Patented June 4, 1968

3,386,919
PREPARATION OF ORIENTED MONOCRYSTALS
Francis Forrat, Marcoussis, France, assignor to Compagnie Generale d'Electricite, Paris, France
Filed Aug. 5, 1963, Ser. No. 299,833
Claims priority, application France, Aug. 10, 1962, 906,663
17 Claims. (Cl. 252—301.1)

ABSTRACT OF THE DISCLOSURE

Process for the preparation of oriented homogeneous monocrystals having the generic formula $ALnO_3$ and having a crystalline structure similar to the Perovskite structure, Ln designating trivalent rare earths and A designating trivalent metals. Basically, the crystal is obtained from a powder of the substance to be crystallized. First, a homogeneous and perfectly crystallized powder is obtained. A monocrystal is then formed therefrom in a hot flame by a modified Verneuil method. The obtained monocrystal is then subjected to appropriate chemical and thermal treatments to eliminate mechanical stresses therein and to modify its coloration as desired. Coloration may be obtained by diffusion or doping with positive ions.

---

Figure 1:
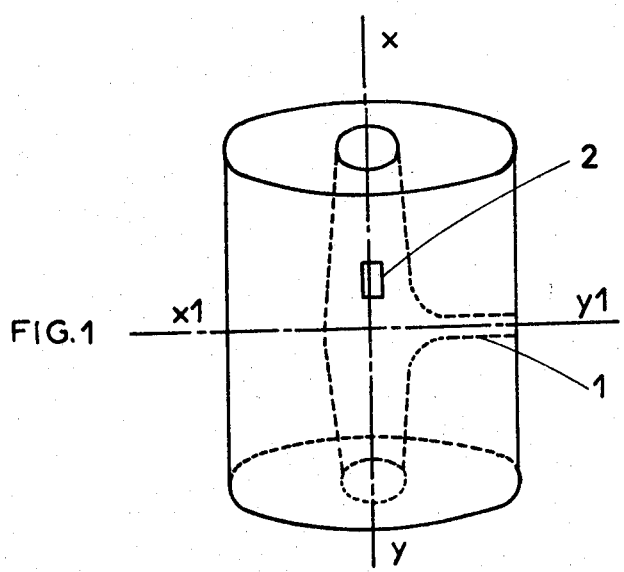

This invention relates to a process for the production of large monocrystals of substances complying with the chemical formula $LnAO_3$ and having a crystalline structure similar or close to the Perovskite structure, A being the generic term to designate the trivalent ions $Ti^{3+}$, $V^{3+}$, $Cr^{3+}$, $Al^{3+}$, $Ga^{3+}$, and Ln being the generic term to designate trivalent rare earths. The present invention relates more particularly to a process of production of lanthanum aluminate of the chemical formula $LaAlO_3$.

It is well known that the crystalline structure of Perovskite (calcium titanate) is a slightly distorted cube, the corners, the middles of the faces, and the center of which are occupied by calcium ions, oxygen ions and a titanium ion, respectively. In a substance complying with the formula $LnAO_3$ (where A and Ln have the above-mentioned meanings) and having a crystalline structure similar or close to the Perovskite structure, Ln-ions and the A ions are substituted for, respectively, the calcium ions and the titanium ion of the calcium titanate. By "rare earths" it is meant to refer to the fifteen elements of this well known class in the Mendelieff classification, having an atomic number comprising between 57 (lanthanum) and 71 (lutetium).

A number of processes are known for the production of monocrystals of lanthanum aluminate; It is possible, for example, to obtain monocrystals of $LaAlO_3$ by precipitation from a saturated solution of $LaAlO_3$ in NaF by using the supersaturated solution at high temperature.

Another process consists of utilizing the so-called Verneuil method. This known method consists in allowing a crystal to grow in the form of a stalagmite from a powder of the substance to be crystallized, falling in the flame of an oxygen and hydrogen blowlamp.

The disadvantage of this process resides in the fact that it is very difficult to obtain a high purity powder by crystallization and the application of this method without considerable modification leads to numerous defects in the structure of the obtained crystal. It is a fact that up to the present time it has never been possible to manufacture such homogeneous monocrystals with a volume of the order of 1 cubic centimeter.

In addition, the monocrystals obtained have defects of homogeneity, are subject to internal mechanical stresses, and have a coloration which cannot be modified; these are all defects which make them unsuitable for certain uses, particularly in the field of optics and stimulated emission, such as their application to lasers, for example.

The present invention enables all these disadvantages to be overcome. It has the object of supplying homogeneous monocrystals, which may or may not be colorless, which have no defects in their structure, and have large dimensions, since in fact their volume may amount to several cubic centimeters.

The process according to the invention is characterized by the fact that use is made of a powder of the substance which it is desired to crystallize, the powder having been specially treated for the purpose and the oriented crystal being obtained from this powder by the Verneuil method adapted to that substance so as to obtain a schematicized morphology of the crystal and to bring it to the desired dimension, said crystal likewise undergoing chemical and thermal treatments intended to provide it with the desired optical and physical properties.

Figure 2:
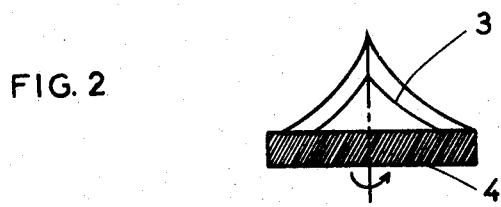
Figure 3:
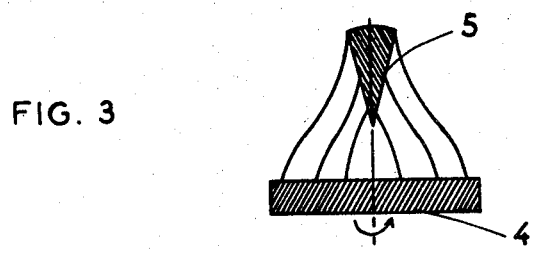
Figure 4:
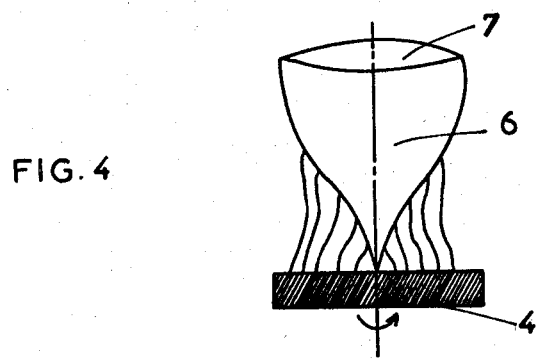
Figure 5:
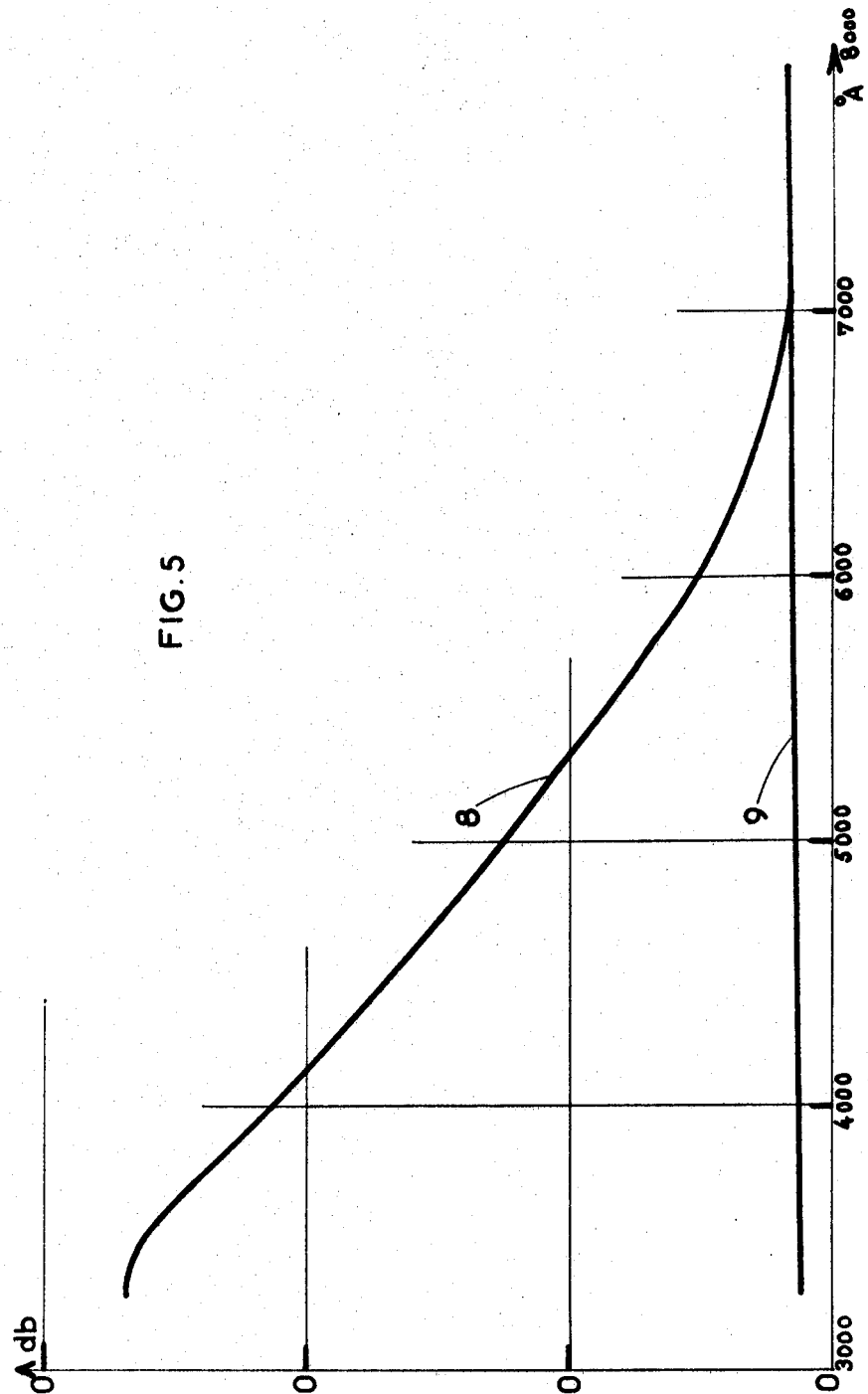

The invention will be better understood by reference to the accompanying drawings, in which:

FIGURE 1 shows a diagrammatic view of the furnace used to carry out the process according to the invention, FIGURES 2, 3 and 4 illustrate in section the successive stages of the production of the monocrystal of lanthanum aluminate, FIGURE 5 shows the absorption curves of the monocrystal of lanthanum aluminate, plotted against the wavelength of projected light.

There is described below, by way of explanation and without in any way limiting the invention, a process of production of monocrystals of lanthanum aluminate, the description being given with reference to the accompanying drawing. It is obvious that this process may be extended to the production of numerous crystals complying with the generic formula $LnAO_3$ and having a crystalline structure similar or close to the structure of the substance known under the name of "Perovskites," A being the generic term to designate the trivalent ions $Ti^{3+}$, $V^{3+}$, $Cr^{3+}$, $Al^{3+}$, $Ga^{3+}$, etc. and Ln being the generic term to designate trivalent rare earths.

The process according to the invention comprises three stages:

(a) The first consisting in obtaining a homogeneous and perfectly crystallized powder of $LaAlO_3$, (b) The second consisting of the actual formation of the monocrystal inside the furnace, (c) The third consisting in subjecting the monocrystal to chemical and thermal treatments intended to eliminate the mechanical stresses existing in the crystal when it leaves the furnace, and in modifying its coloration.

These three stages will be described in greater detail:

(a) *Formation of a powder of lanthanum aluminate*

In order to obtain a monocrystal the subsequent growth of which will be perfect, it is advisable to use a lanthanum aluminate powder which is homogeneous, of great purity, and particularly well crystallized. These conditions are fulfilled by employing the following method:

The starting materials are the alum of aluminum $AlNH_4(SO_4)_2 \cdot 12H_2O$, crystallized several times, and lanthanum oxide $La_2O_3$. In addition it is possible to use any of the lanthanum salts instead of lanthanum oxide, such as for example the oxalates, nitrates, acetates, hydrates, or carbonates. The two substances used—lanthanum oxide or lanthanum salt—must have a high degree of purity. The starting material will for example be lanthanum oxide of 99.997% purity.

The mixing of the two substances, the alum on the one hand and the lanthanum oxide or salt on the other hand is effected in such proportion that the number of atoms of aluminum and the number of atoms of lanthanum are equal and the mixture is dissolved in very pure dilute nitric acid, according to the chemical reactions:

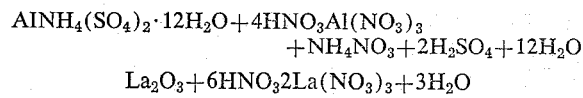

$$La_2O_3+6HNO_3 \to 2La(NO_3)_3+3H_2O$$

Once the reaction is terminated, the nitrates obtained, $Al(NO_3)_3$ and $La(NO_3)_3$, are co-precipitated by a very pure ammonia solution according to the reactions:

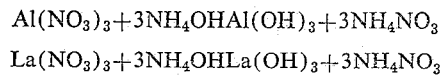

The mixture of hydroxides obtained, $Al(OH)_3$ and $La(OH)_3$, is then treated in the following manner:

In a first stage they are dried at a temperature of 300° C., then progressively calcined to a temperature of 1000° C. in a quartz or alumina crucible; this crucible may advantageously be of platinum rather than quartz, because at the temperature of 1000° C. the commencement of the reaction between the quartz or alumina and the hydroxides treated is already observed.

A mixture of oxides and hydroxides of $LaAlO_3$ is thus obtained, which is ground and homogenized.

In a second stage the mixture of oxides and hydroxides is calcined for a few hours, for example, for 5 hours, at a temperature of 1650° C. in a crucible of alumina or platinum in a furnace, which may advantageously be a graphite resistance furnace. This calcination effects a fritting of the mixture. Study by X-ray diffraction of the ceramic obtained shows that the reaction has been complete and that the grains have a dimension of the order of 1 micron. The object of this high temperature fritting is to eliminate completely the molecules of water retained by the lanthanum, since lanthanum hydroxide, $La(OH)_3$, is in fact very stable. This ceramic is then crushed, finely ground, and sifted in a screen the mesh of which has a width of 0.037 mm.

The two stages of this treatment have the object of obtaining a powder of crystals of lanthanum aluminate, $LaAlO_3$, according to the reaction:

$$La_2O_3+Al_2O_3 \to 2LaAlO_3$$

We then have a lanthanum aluminate powder free from OH– ions.

(b) *Formation of the lanthanum aluminate monocrystal*

The second stage of the process of production of monocrystals is the actual formation of the monocrystal. This stage is characterized by the fact that the growing of the crystal is effected, from the powder of crystals previously obtained, by an adapted Verneuil technique.

FIGURE 1 shows a diagrammatic view of the furnace used, in which two windows 1 and 2 have been made, whereas the so-called Verneuil furnace has only one window. These windows are intended to permit the observation of the growth and centering of the monocrystal. The window 2 is situated in a plane perpendicular to the plane defined by the XY axis of the furnace and the $X_1 Y_1$ axis of the window 1, these two windows being offset in height in relation to one another.

The growth of the monocrystal is effected in the flame of an oxygen and hydrogen blow-lamp, which is not illustrated in FIGURE 1.

FIGURES 2, 3 and 4 illustrate diagrammatically the growth of the monocrystal. The lanthanum aluminate powder is thrown by beating (that is to say by intermittent percussion of a cloth containing said powder) on to a germ 4 placed opposite the window 1. Germ 4 is a germ of the same crystal, in this case the lanthanum aluminate. The germ is given a uniform rotational movement about its axis, while the direction of rotation may be that indicated in FIGURES 2, 3 and 4. The flows of oxygen and hydrogen of the blow-lamp are so regulated as to obtain a cone with concave generatrix 3, in epitaxy on the germ 4 that is having the same vistallographic orientation. FIGURE 2 shows the cone thus obtained.

By way of example without limitation, the following figures are given:

Oxygen flow: start 78 liters per hour, maximum 99 liters per hour.
Hydrogen flow: constant flow 370 liters per hour.
Powder: beating at 20 to 30 strokes per minute.
Inside diameter of furnace: 30 mm.
Jet diameter: 3.2 mm.
Speed of rotation: from 10 to 100 revolutions per minute.

The monocrystals 5 oriented like the germ, is formed of its own accord in the course of the growth of the cone, by progressively widening as shown in FIGURE 3.

When it has thus attained a height of 1 cm. and a diameter of 3 mm., the temperature is progressively increased by increasing the flow of oxygen so as to obtain the desired profile 6, which is illustrated in FIGURE 4.

Because of the high thermal conductivity of $LaAlO_3$, it is absolutely necessary to effect this growth in a progressive manner. In fact, the slightest discontinuity in the flow of the oxygen, the hydrogen, the powder, or in the speed of rotation produces a macle, that is to say the production of two joined monocrystals which are mechanically inseparable but which do not possess the same crystallographic direction, and in addition leads to the fusion of the fritted powder around the foot of the crystal.

When the crystal attains the desired length, for example 5 cm., the flow of hydrogen is progressively reduced until the dome 7 is solidified, and the blow-lamp is extinguished while raising the crystal by 1 to 2 centimeters in the furnace, so that it comes opposite the window 2. It is preferable not to effect slow cooling by simultaneous reduction of the flows of oxygen and since the monocrystal is fairly insensitive to even considerable and non-localized variations of temperature, owing to the isotropy of its crystalline structure and to its high thermal conductivity.

(c) *Chemical and thermal treatments*

These treatments according to the invention have the object on the one hand of modifying in the desired manner the coloration of the monocrystal obtained, and on the other hand eliminating the internal mechanical stresses.

(1) *Chemical treatment*

A general study of the coloration of monocrystals of Perovskite obtained from pure ternary oxides has shown that this coloration was due to the presence of so called V centers. When the electronic structure of the monocrystal is such that it lacks an ion, a number of available electrons equal to the electronic valence of the ion remains in the crystal. These available electrons or holes, known as V centers, vibrate at light frequencies, thus giving a coloration of the crystal. In order to render a monocrystal colorless, the V centers are eliminated, and in order to give a special coloration, doping with transition ions having absorption bands in the visible spectrum is effected, the frequency of these bands being complementary to that corresponding to the desired color.

The lanthanum aluminate monocrystal obtained from an aluminum and ammonium alum and from a pure lanthanum salt is generally orange or red in color, and it may be advantageous to make this crystal colorless or to give it a special coloration.

(a) In order to make it colorless, it is known that it is necessary to eliminate the V centers. When it lacks an $La^{3+}$ ion, these V centers are three in number; in order to eliminate them a diffusion of positive ions is effected. The positive ions may be protons. A diffusion of hydrogen in the crystal will then be effected at a temperature of 1100° C. for several hours.

It is of course possible to use other positive ions, such as for example the ion $C^{4+}$ by diffusion of carbon monoxide in the crystal at high temperature.

Another method of eliminating the V centers consists in utilizing in stage B described above a lanthanum aluminate powder containing a slight excess of lanthanum oxide so as to eliminate, after the production of the crystal, the centers corresponding to the $La^{3+}$ ions, the added excess corresponding to the fraction of lanthanum consumed in the flame or blown away by the gases of the blow lamp, the lack of this fraction of lanthanum causing the presence of the V centers. If the mixtures of the alum of aluminum and ammonium and the lanthanum oxide are such that the number of molecules of lanthanum oxide give a number of atoms of lanthanum in excess of about 1% over the number of atoms of aluminum, the crystal obtained by the stages A and B of the process of the invention will be colorless with a perfect crystalline structure.

(b) In order to give special coloration to the monocrystal obtained, doping with transition ions is effected. The doping may take place in the course of one of the stages described above.

*At the beginning of the treatment.*—It has been indicated above that the metal salts used were aluminum and ammonium alum on the one hand and a lanthanum salt on the other hand. The doping with transition ions will then be effected by using ions such as for example: $Cr^{3+}$, $Mn^{3+}$, $Fe^{3+}$, $Co^{3+}$, $U^{3+}$, etc., utilizing the sulphates or nitrates of these metals.

*In the course of the homogenization of the hydroxides.*—It is known that the mixture of hydroxides of aluminum and lanthanum is calcined and ground several times in order to obtain a perfectly homogeneous mixture. It is in the course of these operations that it will be possible to effect the doping with transition ions, using ions such as for example: $Ti^{3+}$, $Ti^{4+}$, $Nb^{4+}$, $Th^{4+}$, etc., utilizing the oxides of these metals.

*At the end of stage A.*—It is known that at the end of the first stage of the production of the lanthanum aluminate monocrystal, there is obtained a perfectly homogeneous powder of $LaAlO_3$. This powder can then be doped by incorporating in it transition ions originating from rare earths or any of their salts.

These chemical treatments of diffusion of positive radicals and transition ion doping obviously intervene in the optical characteristics of the crystal, by giving characteristic absorption lines.

FIGURE 5 shows the absorption curves of a lanthanum aluminate monocrystal. The values of the absorption in decibels have been plotted as ordinates and the wavelengths of the projected light, in Angstroms, as abscissae.

Curve (8) is the curve of absorption of a monocrystal of $LaAlO_3$ containing lacunae, that is, V centers.

Curve (9) is the curve of absorption of the same monocrystal after it has been subjected to a diffusion of positive ions.

(2) *Thermal treatment*

It is known that when a crystal cools, it is subject to internal tensions which are often considerable and may even effect cracking and in any case make it very fragile. An "annealing" operation eliminates these tensions; in order to do this, the monocrystal is introduced into a furnace and the temperature is slowly raised from 100 to 200° C. per hour until a temperature of 1400° C. is reached, and then the temperature is gradually lowered by 100 to 200° C. per hour; these figures are given solely as examples and may be different depending on the monocrystals treated.

The thermal treatment may be combined with the chemical treatment by diffusion of positive ions as already described. In the case for example of hydrogen diffusion, the monocrystal is slowly brought to the temperature of 1400° C. and the temperature is then slowly lowered to 1100° C., at which temperature it is convenient to effect the diffusion of hydrogen. When this diffusion has been completed, the monocrystal is gradually cooled as described above.

Various variations and modifications may naturally be made to the method of performance which has been given purely by way of illustration, without departing from the framework of the present invention.

I claim:

1. A process for the production of large dimensioned, oriented, homogeneous monocrystals of the generic formula $ALnO_3$ having a crystalline structure similar to the Perovskite structure, Ln being the generic term designating trivalent rare earths and A being the generic term designating trivalent metals,
   comprising in a first stage the preparation of a perfectly crystallized powder of the monocrystal to be produced from a first compound containing said A and a second compound containing said Ln,
   in a second stage the growing of said monocrystal in a modified Verneuil type furnace, from the powder obtained in the first stage,
   said first stage including the steps of:
   mixing said first and second compounds, the mixture containing equal amounts of atoms of said A and said Ln,
   treating the obtained mixture with an acid to obtain a mixture of salts,
   treating said mixture of salts with a base to obtain a coprecipitation of hydroxides of said salts,
   drying, calcining and fritting the mixture of said hydroxides so as to obtain a ceramic product devoid of molecules of water,
   and grinding and homogenizing said ceramic product to obtain a fine powder of perfectly crystallized substance having said generic formula $ALnO_3$,
   said second stage including the steps of:
   placing a germ of a crystal of the same nature as that of the monocrystal to be produced on a rotatable support in a furnace including a housing having a plurality of observation windows and an oxyhydrogen blow-lamp, forming on said germ a cone of agglomerated powder of $ALnO_3$, said cone having a concave generatrix and a crystallographic orientation corresponding to the germ by
   (1) beating onto said germ $ALnO_3$ powder,
   (2) continuously rotating the support of said germ,
   (3) and continuously heating said germ and said cone by the flame of said blow-lamp,
   the form of the cone and of the growth of the monocrystal being controlled by regulating the position, the shape and the temperature of the flame, and the rate of feeding of the $ALnO_3$ powder.

2. The process according to claim 1, comprising the additional step of continuously increasing the temperature of the flame during the growth of the monocrystal, by progressively reducing the rate of hydrogen flow.

3. The process according to claim 1, comprising a final thermal treatment for eliminating the internal mechanical stresses of the oriented monocrystal.

4. A process according to claim 3, wherein said thermal treatment comprises slowly heating said monocrystal and slowly cooling said monocrystal, the maximum temperature being 1400° C. and the rate of variation of the temperature being between 100° and 200° C. per hour.

5. The process according to claim 1, wherein the monocrystal is submitted to a high temperature diffusion of positive ions selected from the group consisting of $H^+$ and $C^{4+}$.

6. The process according to claim 1, wherein the obtained monocrystal contains so-called V centers corresponding to a lack of ions, an excess of lanthanum oxide being added to the mixture of said first stage and the number of atoms of Ln being in excess over the number of molecules of the rare earth A, said excess being lower than 1%.

7. The process according to claim 1, wherein the monocrystal is colored by doping with transition metal ions, the doping being effected on said first and said second compounds simultaneously with the said mixing of said compounds.

8. The process according to claim 1, wherein the monocrystal is colored by doping with transition metal ions, the doping being effected in the first stage after the coprecipitation of said hydroxides.

9. The process according to claim 8, wherein the doping is effected by the use of transition metal ions obtained from a compound selected from the group consisting of trivalent rare earth compounds and the salts of said trivalent rate earth compounds.

10. The process according to claim 1 wherein A is selected from the group consisting of $Ti^{+3}$, $V^{+3}$, $Cr^{+3}$, $Al^{+3}$ and $Ga^{+3}$.

11. The process according to claim 1, wherein said trivalent metal is $Al^{+3}$ and said rate earth is La.

12. The process according to claim 11, wherein said first compound is an alum of aluminum and ammonium, said second compound is lanthanum oxide, and wherein the mixture of said compounds is treated with dilute nitric acid to obtain a mixture of salts comprising $Al(NO_3)_3$ and $La(NO_3)_3$, this mixture being precipitated by an ammonia solution to obtain hydroxides of La and Al.

13. The process according to claim 12, wherein said mixture of hydroxides is dried at a temperature of about 300° C., progressively calcined to a temperature of about 1000° C. and fritted by grinding and homogenizing the obtained powder and then further calcining the powder for a few hours at a temperature of about 1,650° C.

14. The process according to claim 1, wherein said first compound is an alum of aluminum and ammonium, said second compound is a salt selected from the group consisting of the oxalates, nitrates, acetates, hydrates and carbonates of lanthanum, the mixture of said compounds being treated with dilute nitric acid to obtain a mixture of salts comprising $Al(NO_3)_3$ and $La(NO_3)_3$, the salts of the latter mixture being precipitated by an ammonia solution to obtain hydroxides of La and Al.

15. The process according to claim 7, wherein said transition metal ions are obtained from a salt of a metal selected from the group consisting of Cr, Mn, Fe, Co and U.

16. The process according to claim 15, wherein said salt is selected from the group consisting of nitrates and sulfates.

17. The process according to claim 8, wherein said transition metal ions are obtained from a compound selected from the group consisting of the oxides of Ti, Nb and Th.

No references cited.

CARL D. QUARFORTH, *Primary Examiner.*

S. J. LECHERT, JR., *Assistant Examiner.*